United States Patent [19]

Casavant et al.

[11] Patent Number: 5,426,464
[45] Date of Patent: Jun. 20, 1995

[54] FIELD ELIMINATION APPARATUS FOR A VIDEO COMPRESSION/DECOMPRESSION SYSTEM

[75] Inventors: Scott D. Casavant, East Windsor, N.J.; Tristan Savatier, Los Angeles, Calif.

[73] Assignee: RCA Thomson Licensing Corporation, Princeton, N.J.

[21] Appl. No.: 324,558

[22] Filed: Oct. 18, 1994

Related U.S. Application Data

[62] Division of Ser. No. 4,753, Jan. 14, 1993.

[51] Int. Cl.[6] .............................................. H04N 7/50
[52] U.S. Cl. .................................. 348/415; 348/401; 348/423
[58] Field of Search ................. 348/97, 415, 416, 413, 348/423, 401; H04N 7/137

[56] References Cited

U.S. PATENT DOCUMENTS

| | | | |
|---|---|---|---|
| 3,184,542 | 5/1965 | Horsley | 348/415 |
| 4,998,287 | 3/1991 | Katznelson | 348/97 |
| 5,093,720 | 3/1992 | Krause | 348/416 |

Primary Examiner—Howard W. Britton
Attorney, Agent, or Firm—Joseph S. Tripoli; Eric P. Herrmann; Ronald H. Kurdyla

[57] ABSTRACT

Video signal compression apparatus includes a memory for storing two fields of image data and providing fields of image data separated by one frame intervals. Image data from corresponding fields of successive frames are subtracted to generate field differences. The field differences are accumulated over respective field intervals, and the sum is compared against a predetermined value. If a sum of differences over a field is less than the predetermined value, the most recent field is considered to be redundant and may be excised. After respective fields are excised, frames of video signal are composed from the remaining fields. The field types (e.g., odd or even) of the fields in the memory are determined, and the data is accessed from the respective fields in memory such that data from odd and even fields occupy odd and even lines in the composed frames respectively. Flags are associated with composed frames to indicate which fields contain data associated with excised fields, and which field of the composed frames should be displayed first.

16 Claims, 5 Drawing Sheets

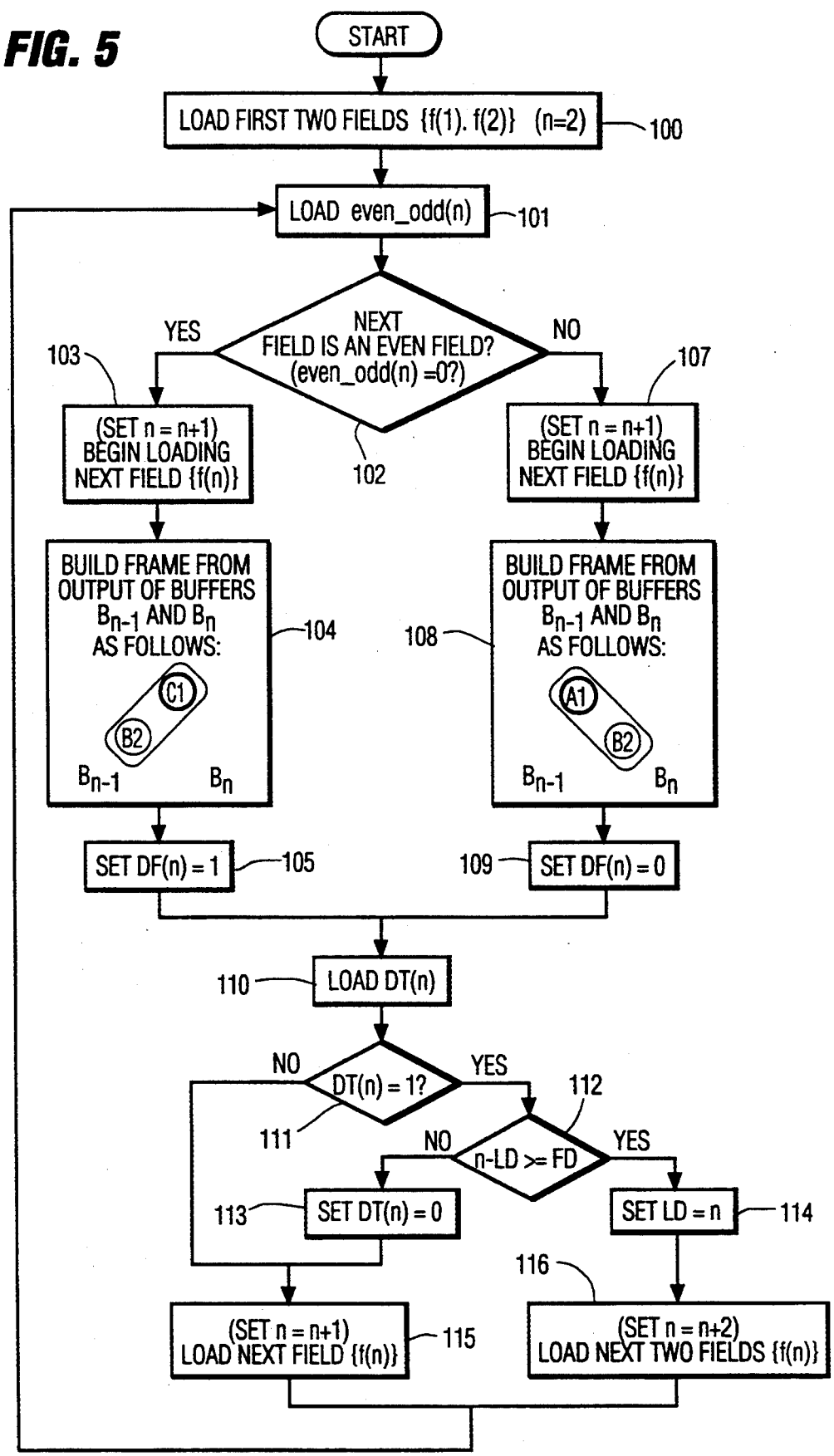

FIELD ELIMINATION APPARATUS FOR A VIDEO COMPRESSION/DECOMPRESSION SYSTEM

This is a divisional application of Ser. No. 08/004,753, filed 14 Jan. 1993.

This invention relates to apparatus for processing video signal prior to signal compression and post decompression. More particularly it relates to apparatus for eliminating redundant fields of video signal (at an encoder) and restoring (at a decoder) fields of video signal that have been excised by an encoder.

BACKGROUND OF THE INVENTION

Currently much effort is being expended in developing systems for compressing video signals for both television signal transmission, and multi-media purposes, i.e. computer usage. This effort is typified by the ongoing development of a compressed video standard, which is currently identified as MPEG. (MPEG stands for "Moving Pictures Expert Group", which is a committee of the ISO, the International Organisation For Standardisation.) MPEG is a compressed video signal protocol describing a hierarchically layered motion compensated, Discrete Cosine Transformed transformed, Quantized, statistically encoded etc. signal format, a draft of which is identified as ISO document ISO-IEC/JTC1/SC29/WG11 MPEG 92/160. The MPEG protocol requires that video signal be encoded (compressed) on a frame basis in groups of frames, GOP's. The compressed signal for a GOP includes a GOP header followed by a frame header, followed by a slice header (a slice being a portion of a frame comprising, for example, 16 horizontal rows), followed by a macroblock header, (a macroblock being for example a 16×16 matrix of pixels) followed by blocks of pixel data, followed by the next frame header and so on.

Nominally a compression apparatus arranged to provide compressed data according to the MPEG format, receives data either on a field or frame basis, groups this data into GOP's, and performs the requisite compression processes to generate a MPEG signal. Note however, if the source material is video signal originally produced on film and converted to video via a Telecine, that is by 3:2 pulldown, one field out of five is redundant. Removal of the redundant fields from such material immediately provides a twenty percent increase in compression efficiency. Further, even if the video signal was produced by a video camera, much of this video signal may represent still images, in which case frames of data may be redundant. Elimination (at least in part) of some of the still image redundancy will also effect an increase in compression efficiency.

In order to realize such enhancements to compression efficiency, it is necessary to identify image field redundancies and thereafter excise these fields prior to application to the compression apparatus. Further, after fields have been excised, a system of identifying excised fields must be implemented to inform the reciprocal decoding apparatus to regenerate the excised fields. The present invention is directed to apparatus for detecting redundancy in video image fields, excising ones of the redundant video image fields, and encoding the remaining data in a fashion to enable a decoding apparatus to restore the excised fields.

SUMMARY OF THE INVENTION

The present invention includes a memory for storing two fields of image data and providing fields of image data separated by one frame intervals. Image data from corresponding fields of successive frames are subtracted to generate field differences. The field differences are accumulated over respective field intervals, and the sum is compared against a predetermined value. If a sum of differences over a field is less than the predetermined value, the most recent field is considered to be redundant and may be excised form the video data stream.

After respective fields are excised from the video signal stream, frames of video signal are composed from the remaining fields. The field types (e.g., odd or even) of the fields in the memory are determined, and the data is accessed from the respective fields in memory such that data from odd and even fields occupy odd and even lines in the composed frames respectively. Flags are associated with composed frames that contain data corresponding to excised redundant data. Further flags are generated to indicate which field in a frame including such redundant data contains the redundant data. The flags are incorporated into the compressed video data with the associated frames after the frames of video data are compressed.

At the receiver portion of a video signal compression system, the compressed signal is examined and any field redundancy flags are removed. The compressed data is then decoded and decompressed video signal is loaded into a display memory. Subsequently the display memory is read to provide an image in raster format. The memory control apparatus is made responsive to respective redundancy flags to repeat the display of associated fields of image data corresponding to excised fields.

BRIEF DESCRIPTION OF THE DRAWINGS

FIG. 5 is a flow chart detailing the functional operation of the resequencer of FIGS. 3 and 4.

DETAILED DESCRIPTION

Figure 1:
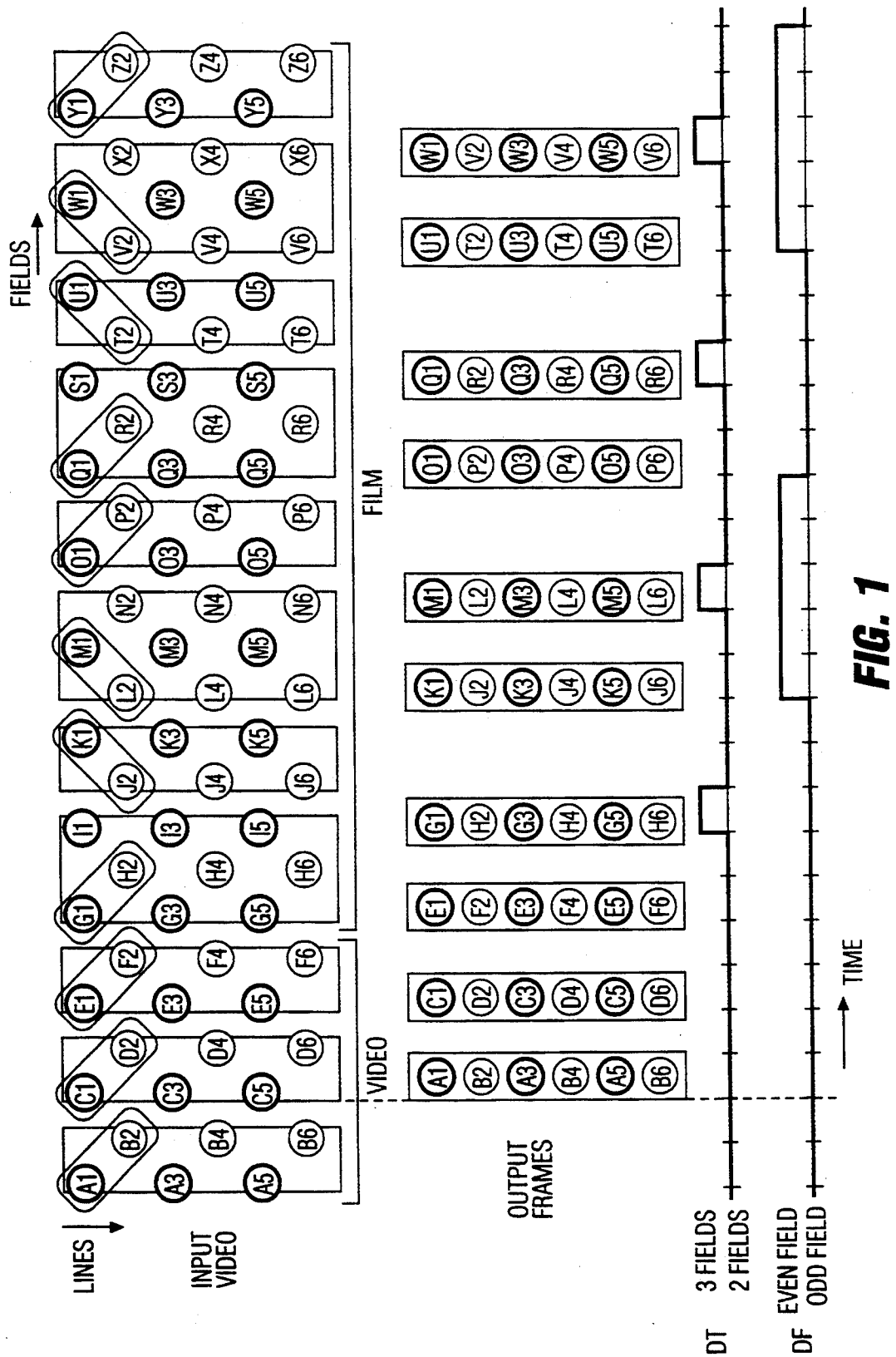
FIG. 1 is a pictorial representation and waveform diagram of a sequence of video signal input frames and reconstituted frames, which representation is useful in describing the invention.

Refer to FIG. 1 and the row of boxes designated input video. Each column of circles represents a field of video signal, with each circle in a field representing a horizontal line. In that portion of the row of boxes designated "video", the respective boxes encompassing two such fields represent frames of interlaced video signal generated by, for example, a video camera. The portion of the row of boxes designated "film", constitutes video signal developed by, for example, a telecine wherein one of every four occurring fields is reproduced in the signal stream. The repeated fields are incorporated in the boxes encompassing three fields. For example, in the box including the fields L, M and N, field N is a repeat of field L.

The row of boxes designated output frames represents resequenced frames of video signal after redundant fields have been excised. In this figure it is assumed that the "video" frames contain moving images, and therefor only "film" frames will have redundant fields of information, whether or not the "film" sequences contain moving images. In the FIGURE, the resequenced fields are arranged in non-interlaced frames for application to, for example, an MPEG encoder. It can be seen that for every five fields of input signal designated "film" frames, the output frames include only four fields, effecting a 20% data reduction.

The input video signal could just as well represent still "video", in which case successive even fields will be identical except for noise contributions, and successive odd fields will be identical except for noise contributions. In the no-motion or still video signal instance, the redundant fields may occur randomly or bunched together. If the redundant fields occur randomly, the present system will excise the redundant fields as they occur. If, on the other hand, still fields occur in relatively large bursts, the preferred embodiment of the invention will only excise m of every n redundant fields, where m and n are integers with n greater than m. This constraint is imposed to preclude the system rate buffer from underflowing. Note, representative values for n and m are 3 and 1 or 5 and 1, etc.

A signal DT indicates the ones of the resequenced frames that include a field corresponding to a field which has been excised. A representation of the signal DT will be included in the transmitted encoded signal to inform the receiver that one of the fields in the associated frame should be displayed twice. A second signal DF indicates which field in every frame is to be displayed first by an interlace display system. A representation of the signal DF is also included in the transmitted encoded signal. It will be noted from the input and output video fields/frames that even fields nominally occur in time after odd fields. That is an interlace frame includes an odd field interlaced with a subsequently scanned even field. However when video data is excised on a field basis, reconstructed output frames may include an odd field with a prior occurring even field. Hence it is necessary to keep track of which field in a reconstructed frame occurred first. In other words, when a field is repeated at the receiver as a substitute for an excised field, it is necessary to know which field of the subsequent frame should be interlaced with the repeated field.

Figure 2:
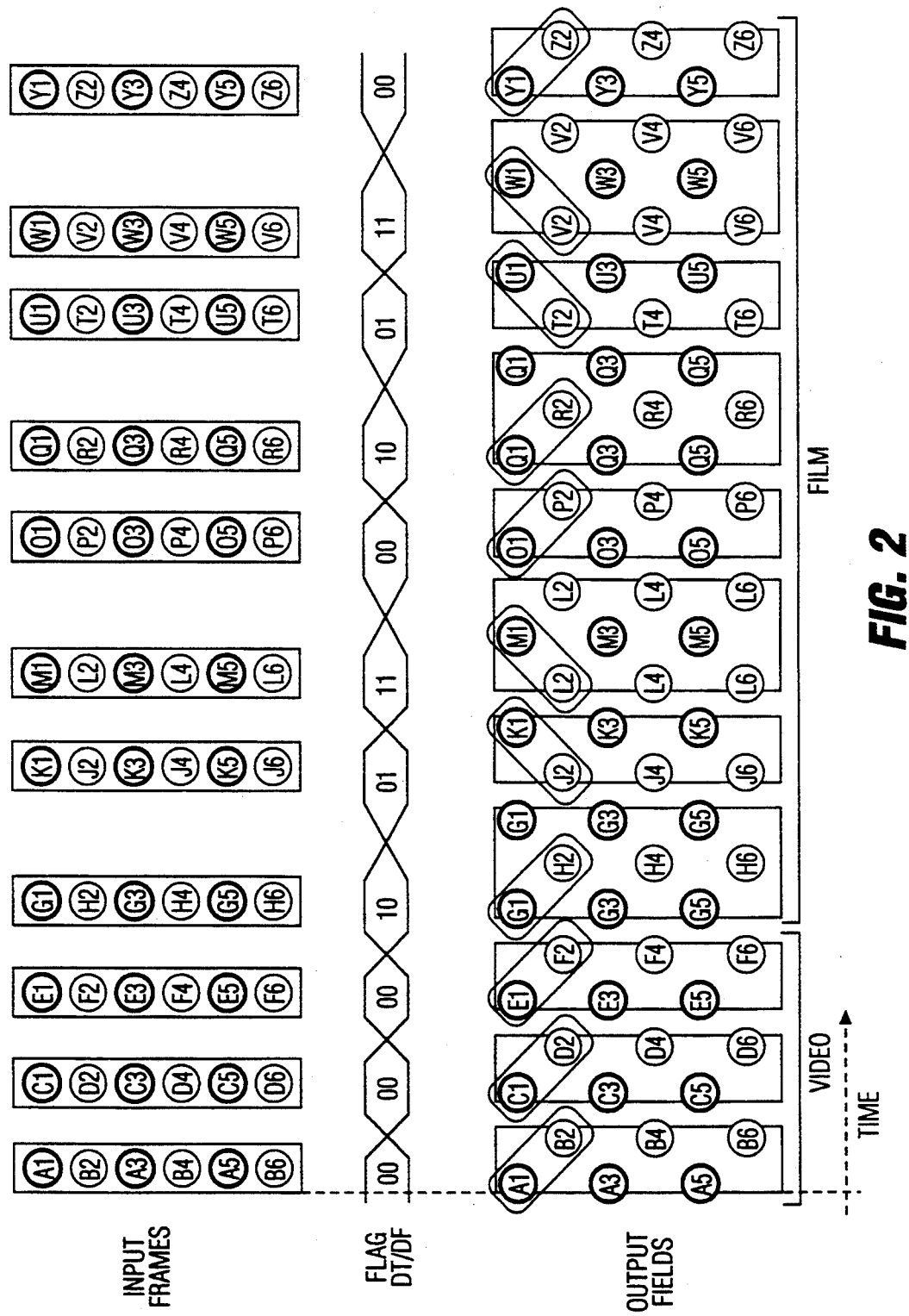
FIG. 2 is a pictorial representation and flag signal diagram of a sequence of video signal output frames provided by a decoder apparatus, and a pictorial representation of resequenced fields of video signal for providing an interlaced video signal, which representations are useful in describing the invention.

In FIG. 2 the row of boxes designated input frames represents the output frames of FIG. 1 after having been decoded in an appropriate receiver. Associated with the respective frames are the corresponding signal DT and DF represented as two-bit binary words. The leftmost and rightmost bits represent the signals DT and DF respectively. A one in the left bit position indicates that the associated frame includes a redundant field. A one and a zero in the right bit position indicates that the even and odd fields respectively, of the associated frame is to be displayed first.

The row of boxes designated Output Fields represents the sequence that the fields comprising the input frames should be displayed.

Figure 3:
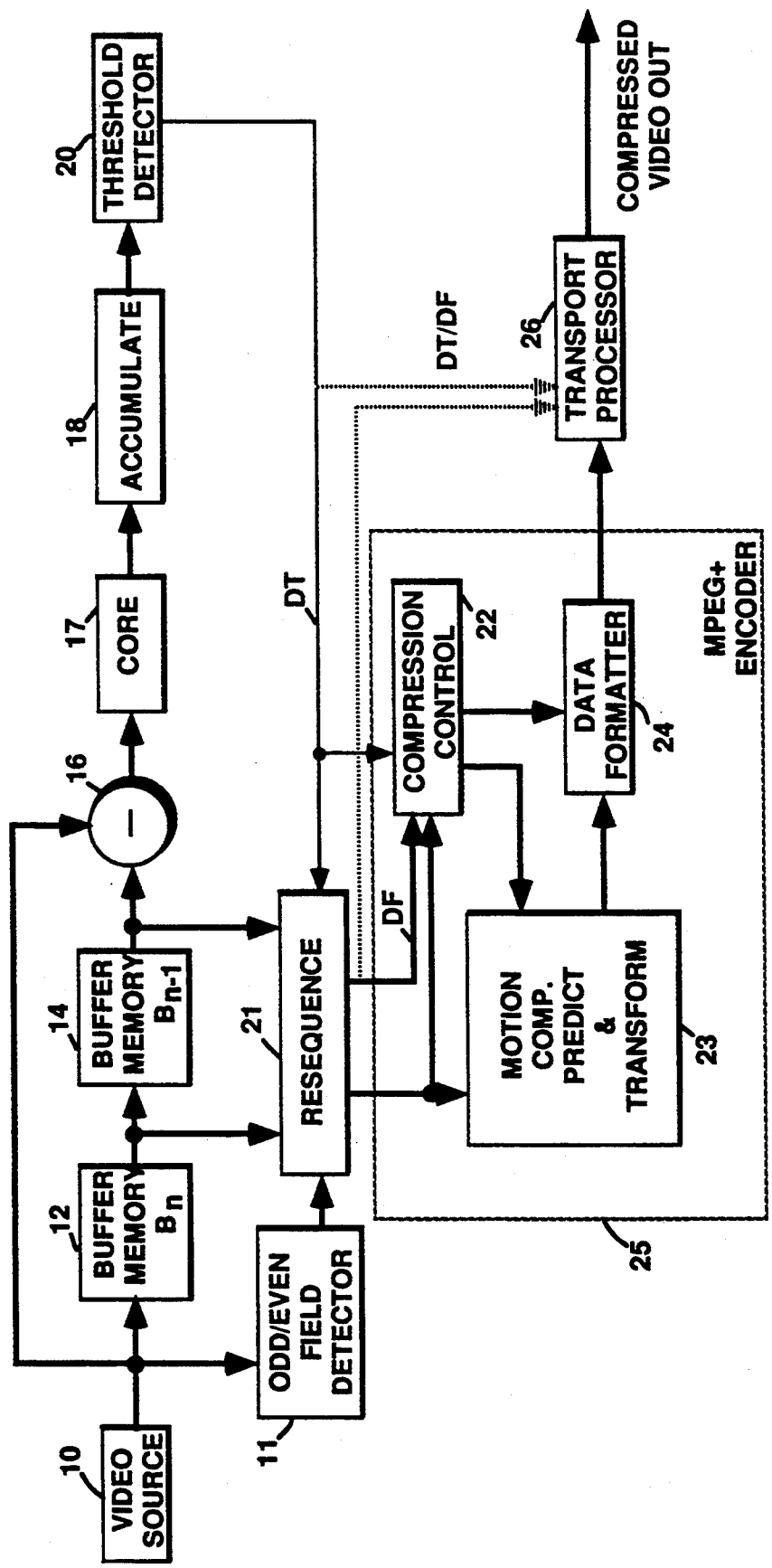
FIG. 3 is a block diagram of apparatus for excising redundant fields of video signal and generating flag signals.

FIG. 3 illustrates apparatus for detecting redundant fields, excising redundant fields and reconstructing frames of video signal from the remaining fields. Video signal is applied from a source 10 to a first buffer memory ($B_n$) 12 and a subtracter 16. An output from the buffer memory 12 is coupled to a second buffer memory ($B_{-1}$) 14. The output of the second buffer memory is coupled to the second input of the subtracter 16. The first and second buffer memories each delay signal by one field period, hence the two video signals applied to the subtracter 16 correspond to like spatial positions of like field types separated by one frame interval. If two fields of video signal separated by a frame are identical (excluding noise) the 87,082 differences provided by the subtracter 16 over respective field periods will be zero (assuming the video signal represents luminance only). The differences developed by the subtracter 16 are applied to a coring circuit 17, which eliminates signal differences less than a predetermined value in order to minimize the effects of signal noise in the video signal differences. The cored difference values are applied to an accumulator 18 wherein the absolute values of the differences are accumulated (summed) over respective field intervals. The summed values are applied to a threshold detector 20 wherein they are compared to a threshold value, and if the sum of differences for a respective field is less than the threshold value, the field stored in buffer memory 12 is considered redundant with the lastmost previous field of the same type, that is the last field read out of buffer memory 14. If the sum is greater than the threshold value, the field currently stored in buffer memory 12 in considered non-redundant.

Video data from the buffer memories 12 and 14 are applied to a resequencer 21, and video data from the source 10 are applied to the odd/even field type detector 11. The resequencer 21 responsive to field type data from the detector 11, and data from the threshold detector 20, excises and reformats the fields of data from the source 10. The resequenced video signal data is applied to a compression apparatus 23 which may include a motion compensated predictive encoder associated with a Discrete Cosine Transform encoder, and statistical and run length encoders. Compressed video signal provided by the compression apparatus 23 is applied to a data formatter 24. The data formatter formats the compressed data with ancillary data for synchronization and/or error detection/correction.

If the compressed video signal is to be transmitted over a medium other than copper wire, for example, it will be necessary to provide the compressed video signal with further noise protection. Hence the compressed data from the data formatter 24 is applied to a transport processor 26 which adds signal redundancy. This redundancy is specific to certain types of data critical to signal decoding. The transport processor 26 forms packets of data having a payload of a predetermined number of compressed video bits, and flexible headers including data which identifies the spatial location within respective images from which the payload data was derived. For further information of transport processors of this type see U.S. Pat. No. 5,168,356 entitled "Apparatus for Segmenting Encoded Video Signal For Transmission".

The formatter 24 and the compression apparatus 23 operate under the control of a compression controller 22. The controller 22 receives video data and display data (DF) from the resequencer 21, and data DT from the threshold detector 20. The controller 22 will nominally operate as a state machine to condition the compressor to provide data in a predetermined sequence, and to condition the formatter 24 to layer the output data in a predetermined hierarchy, e.g. according to the MPEG signal protocol. If in fact the controller and formatter are programmed to provide MPEG formatted data, the aforementioned flag signals DT/DF will not be introduced in the data stream by the formatter 24. The signals DT/DF will be provided to the transport processor 26 with the associated frames of compressed video data. The signals DT/DF may thereafter be incorporated in respective transport packet headers associated with transport packets conveying payloads which include Frame Header information.

Alternatively, if the encoder 25 is not an MPEG encoder, but perhaps a modified MPEG+ encoder, provision may be made to incorporate the signals DT/DF within the frame headers of the modified MPEG compressed data. In this instance the controller 22 and formatter 24 will be prearranged to incorporate the signals DT/DF directly into the compressed video data stream. It will be appreciated by those skilled in video signal compression techniques, and armed with the foregoing disclosure, that varied other methods may be implemented for conveying the respective flag signals associated with fields/frames conveying redundant data.

Figure 4:
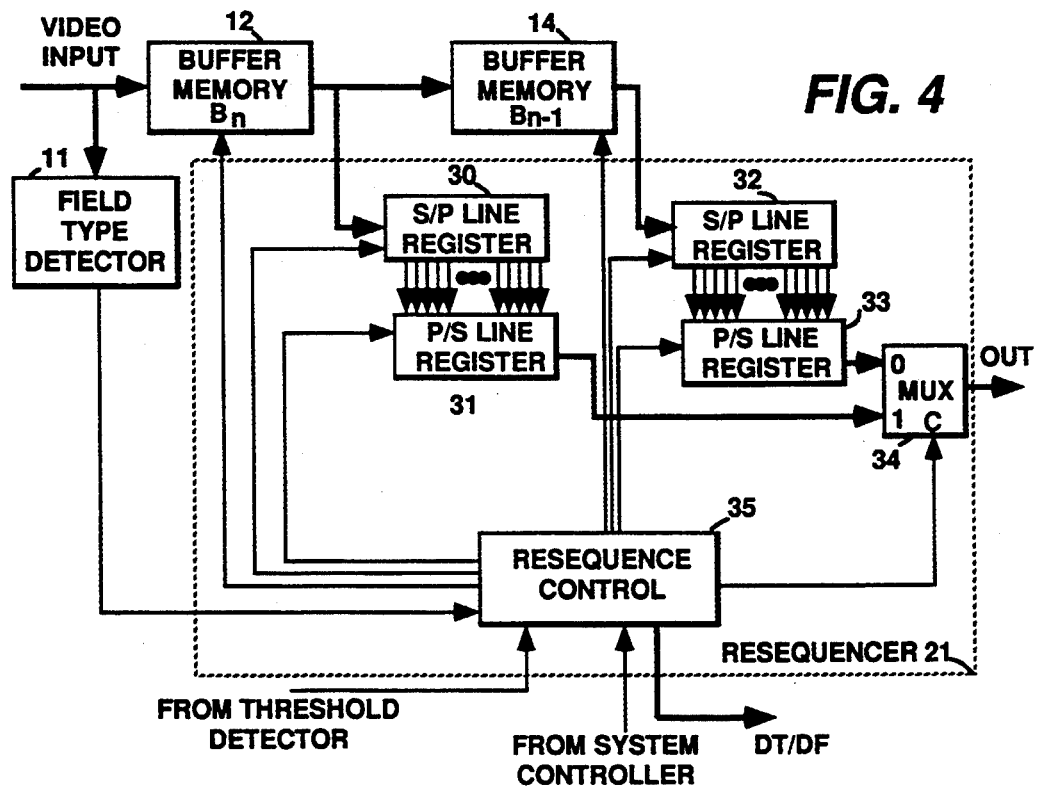
FIG. 4 is a block diagram of a resequencer which may be utilized in the FIG. 3 apparatus.

FIG. 4 illustrates exemplary apparatus for the resequencer 21 of FIG. 3. The resequencer 21 of FIG. 4 forms frames from fields of video data. That is, it interleaves horizontal lines of even fields with horizontal lines of odd fields to form a frame from two fields. The interleaving is performed by the register pairs 30, 31 and 32, 33. Buffer memories 12 and 14 will always be conditioned to contain the two fields to be combined into respective frames. The field memories 12 and 14 will be read out concurrently, a line at a time. Respective lines read out of memory 12 are written to a serial-input-parallel-output register 30, having parallel output connections coupled to parallel input connections of a parallel-input-serial-output register 31. After a respective line is written to register 30, it is loaded into register 31. Thereafter the line is serially read out of register 31. Similarly respective lines read from memory 14 are written to register 32, transferred to register 34, and then serially read out of register 34. The output signals provided by registers 31 and 33 are coupled to respective input connections of a multiplexer 34. The multiplexer 34 is conditioned by the resequence controller 35 to couple even field lines in even field line positions and odd field lines in odd field line positions within each composed frame.

In this exemplary embodiment, data is read from the field memories 12 and 14 at a predetermined sample rate a line at a time. Thereafter the registers 31 and 32 are clocked mutually exclusively, under control of the controller 35, at twice this sample rate such that the signal output from the multiplexer consists of a line of video signal from register 31 (33) followed by a line of video signal from register 33 (31). As respective fields are applied to the buffer memories, the field detector 11 determines whether the fields are odd or even and conveys such field type information to the controller 35. Controller 35 therefore knows which of buffer memories 12 and 14 contain the odd and the even field, and thus may appropriately switch the multiplexer 34. The controller 35 is also supplied with data from the threshold detector and is arranged to generate the signal DT/DF.

FIG. 5 is a flow chart of the operation of the FIG. 4 resequencer, which operates as follows. At system startup two consecutive fields are loaded [100] into the buffer memories 12 and 14 and an index n is set to 2. The resequencer then fetches [101] the field type (even or odd) of the field loaded in memory 12. The field type is examined [102], and if the next field should be an even (odd) field the system branches to path 103, 104, 105 (107, 108, 109).

If even, the index n is incremented by one, and loading of the next field into memory 12 is initiated [103]. If even then the field currently residing in memories 12 ($B_n$) and 14 ($B_{n-1}$) are odd and even respectively. The current frame is built [104] from the fields currently in memories $B_n$ and $B_{n-1}$, with lines of video signal from memory $B_n$ as odd lines and lines of video signal from memory $B_{n-1}$ as even lines. The odd and even fields in memories 12 and 14 are in reverse time order and thus the signal display first (DF) is set to a logic one value [105].

If odd, the index n is incremented by one, and loading of the next field into memory 12 is initiated [107]. If odd then the field currently residing in memories 12 ($B_n$) and 14 ($B_{n-1}$) are even and odd respectively. The current frame is built [108] from the fields currently in memories $B_n$ and $B_{n-1}$, with lines of video signal from memory $B_n$ as even lines and lines of video signal from memory $B_{n-1}$ as odd lines. The even and odd fields in memories 12 and 14 are in normal order and thus the signal display first (DF) is set to a logic zero value [109].

After establishing the state of the signal DF, The signal DT from the threshold detector is loaded [110] and examined [111] for the current field. If the signal DT is low indicating no field redundancy, the next field is loaded [115] into memory so the memories 12 and 14 contain a new frame of data. The system then returns to step [101].

If the signal DT is high indicating field redundancy, a variable last_drop (LD) is examined ]112[. The variable LD keeps track of the most recently dropped field. The variable LD is subtracted from the index n, and the difference is compared to a further predetermined value drop_frequency FD. The value FD determines the number of fields that are permitted to be dropped per sequence of fields. The lowest valid value of FD is 3 permitting one in three fields to be dropped. An FD value of 5 will permit no more than one in five fields to be dropped. If the difference (n−LD) is less than or equal to FD, DT is set to zero [113] and the system branches to step 115. In this instance the system precludes the dropping of a field even though it is redundant. Alternatively if the difference is greater than FD, then LD is set to n [114] and the next two fields are loaded [116] into the memories 12 and 14. This has the effect of dropping the field currently residing in the memory 14. The system then branches back to step [101].

Figure 6:
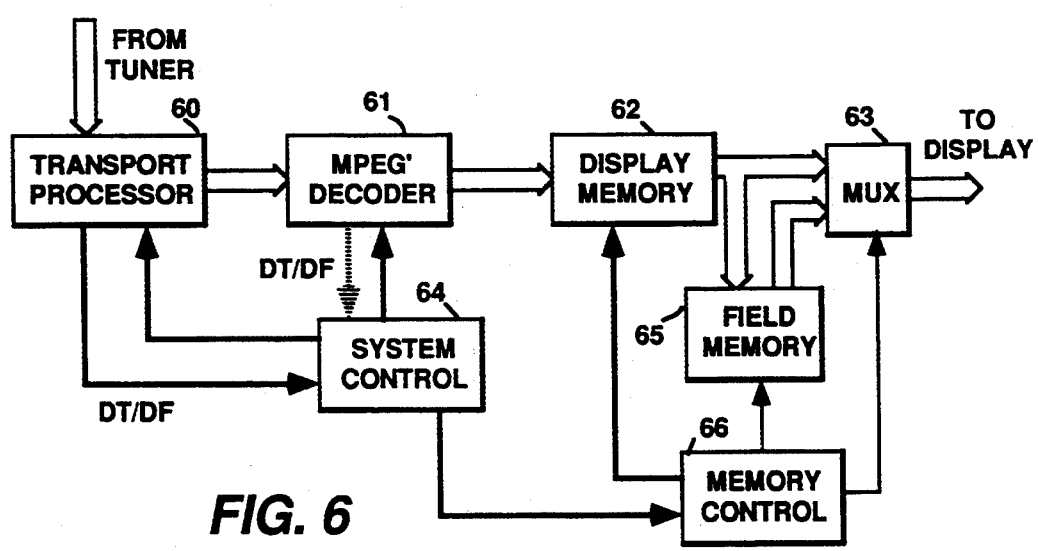
FIG. 6 is a block diagram of decoder apparatus for generating substitute video fields for excised redundant video fields.

FIG. 6 illustrates an exemplary embodiment of a receiver prepared to utilize the flag data DT/DF to reconstruct video data in which redundant fields have been excised. Compressed video data from a transmission path, for example a tuner is applied to a transport processor 60. The transport processor receives the transport packets of compressed video and synchronizing information etc., separates the compressed video signal from the transport packet headers, and applies the compressed video signal to an appropriate decoder/decompresser. If the redundant field flag data DT/DF is contained in the packet transport headers, this flag data is separated and applied to the system controller 64, with any other ancillary data needed by the system controller 64. If the flag data DT/DF is contained in the compressed video signal per se, it is separated by the decoder/decompresser 61, and applied to the system controller 64. The system controller ultimately directs the signal DT/DF to a memory controller 66.

Compressed video signal is decompressed by the decoder 61 and loaded into a display memory 62. Nominally the display memory 62 will contain a frame of decompressed data. The decompressed data is coupled from the display memory to an output display device (or to a recording device etc) via a multiplexer 63. When no field redundancy is indicated, data is coupled directly from the memory 62 to the output device.

The output of the display memory is also coupled to an additional field memory 65, and the output of the field memory 65 is coupled to a second input of the multiplexer 63. The display memory 62, field memory 65 and multiplexer 63 are controlled by a memory controller 66. The memory controller 66 is conditioned by the system controller 64, including signals DT/DF, to provide video data from the respective memories for display. If no field redundancy is indicated by the signals DT/DF, decompressed odd and even fields are respectively loaded into the display memory in odd and even field positions responsive to the signal DF. The odd and even fields are then consecutively read from the memory 62 in interlace fashion.

If a field associated with redundant information is indicated by the signal DT/DF, when such field is read out to the display device it is concurrently captured in the field memory 65. Thereafter the field of video signal in the field memory 65 is coupled to the display device by the multiplexer 63 in the appropriate field position. Depending on the particular decompression system, it may not be necessary to include an extra field memory 65 and multiplexer 63, for field repeats, and the repeating of fields of video signal may be performed directly from the display memory 62. The latter arrangement reduces the amount of necessary hardware, but increases timing constraints on both the display memory and the decompresser 61.

What is claimed is:

1. Apparatus for compressing video signal comprising:
   a source of video signal;
   means for comparing respective even lines of consecutive image frames and respective odd lines of consecutive image frames, and for generating a signal indicative of all even lines in consecutive image frames or all odd lines in consecutive image frames being substantially redundant;
   means responsive to said signal indicative of all even or all odd lines of image frames being substantially redundant, for excising said all even or all odd lines in ones of image frames containing said all even or all odd substantially redundant lines;
   means for constructing consecutive image frames of video signal from remaining video signal;
   means for generating a signal DF indicating the temporal order of occurrence of odd and even lines in respective reconstructed image frames; and
   means for combining said reconstructed image frames and said signal DF for transmission.

2. The apparatus set forth in claim 1 further comprising:
   means responsive to said signal indicative of all even or all odd lines of image frames being substantially redundant, for generating a signal DT indicating which ones of said reconstructed frames include video data associated with said substantially redundant lines; and
   means for combining said signal DT with said reconstructed image frames for transmission.

3. The apparatus set forth in claim 1 wherein said even lines comprise even fields and said odd lines comprise odd fields, and said apparatus includes means responsive to said signal indicative of all even or all odd lines of image frames being substantially redundant, for excising only a predetermined number R of fields for every P consecutive occurring fields from said source of video signal, where R and P are integers with $P > R$.

4. The apparatus set forth in claim 1 further including:
   compression means responsive to said reconstructed image frames for compressing said reconstructed image frames on a frame basis;
   transport processor means responsive to compressed video data from said compression means, and to said signal DF, for forming transport packets having respective transport headers and payloads, said transport headers being arranged to include said signal DF, and said payloads being arranged to contain said compressed video data.

5. The apparatus set forth in claim 2 further including:
   compression means responsive to said reconstructed image frames for compressing said reconstructed image frames on a frame basis;
   transport processor means responsive to compressed video data from said compression means, and to said signals DF and DT, for forming transport packets having respective headers and payloads, said headers being arranged to include said signals DF and DT, and said payloads being arranged to contain said compressed video data.

6. Video signal compression apparatus comprising:
   a source of video signal including even and odd fields;
   means for respectively comparing even and odd fields from successive frames and if ones of the even or odd fields in successive frames are substantial similar, excising one such similar field per N occurring fields, where N is an integer greater than 2; and
   means for generating output frames from the remaining non excised fields, for generating first flag data indicating fields to be repeated upon reproduction, and for generating second flag data indicating the order in which fields of respective output frames should be displayed when reproduced.

7. The compression apparatus set forth in claim 6 further including:
   means responsive to said output frames for compressing said output frames to provide compressed video signal data corresponding to respective output frames; and
   means for combining in a predetermined sequence, said first and second flag data and corresponding compressed video signal.

8. The compression apparatus set forth in claim 7 wherein said means for combining includes a transport processor for forming packets of data for transmission, respective packets including a header and a payload, said payload comprising compressed video data and said header including said first and second flag data.

9. Video signal compression apparatus comprising:
a source of video signal including even and odd fields;
means for excising ones of even and odd fields which are respectively substantially similar in successive frames;
means for generating output frames from the remaining non excised fields; and
means for compressing said generated frames.

10. The apparatus set forth in claim 9 further including:
means, for generating first flag data indicating respective generated output frames which contain a field to be repeatedly displayed when decompressed; and
means for generating second flag data indicating which field of respective output frames should be displayed first when reproduced.

11. The apparatus set forth in claim 9 further including:
means, for generating first flag data indicating respective generated output frames which contain a field to be repeatedly displayed when decompressed.

12. The apparatus set forth in claim 9 further including:
means, for generating first flag data indicating respective fields to be repeatedly displayed when decompressed; and
means for generating second flag data indicating the order in which fields are to be displayed when reproduced.

13. The apparatus set forth in claim 12 further including:
means for combining in a predetermined sequence, said first and second flag data and corresponding compressed video signal.

14. The compression apparatus set forth in claim 13 wherein said means for combining includes a transport processor for forming packets of data for transmission, respective packets including a header and a payload, said payload comprising compressed video data and said header including said first and second flag data.

15. Video signal compression apparatus comprising:
a source of video signal occurring as fields/frames
circuitry for determining which of successive said fields/frames are substantially similar and excising portions of said fields/frames which are substantially similar;
a video signal compressor for compressing the remaining fields/frames;
means for generating flag data indicative of fields/frames to be repeated and indicative of the temporal order of reproduced fields/frames; and
means for combining compressed video signal and said flag data for transmission.

16. The apparatus set forth in claim 15 wherein said video signal includes even and odd fields and said circuitry for determining includes:
means for respectively comparing even and odd fields from successive fields/frames and if ones of the even or odd fields in successive fields/frames are substantially similar, excising ones of such substantially similar fields; and said apparatus further includes;
means for generating output frames from the remaining non excised fields; and
means for compressing said generated frames.

* * * * *